(12) United States Patent
Ha et al.

(10) Patent No.: US 9,130,215 B2
(45) Date of Patent: Sep. 8, 2015

(54) SEPARATOR, METHOD FOR PRODUCING THE SAME AND ELECTROCHEMICAL DEVICE INCLUDING THE SAME

(71) Applicant: LG CHEM, LTD., Seoul (KR)

(72) Inventors: Jeong-Min Ha, Daejeon (KR); No-Ma Kim, Daejeon (KR); Byeong-Gyu Cho, Daejeon (KR); Kee-Young Kim, Daejeon (KR); Sun-Mi Jin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 106 days.

(21) Appl. No.: 13/965,660

(22) Filed: Aug. 13, 2013

(65) Prior Publication Data

US 2014/0050965 A1 Feb. 20, 2014

Related U.S. Application Data

(63) Continuation of application No. PCT/KR2012/001099, filed on Feb. 14, 2012.

(30) Foreign Application Priority Data

Feb. 15, 2011 (KR) .................. 10-2011-0013312
Feb. 10, 2012 (KR) .................. 10-2012-0013889

(51) Int. Cl.
*H01M 2/16* (2006.01)
*H01M 4/82* (2006.01)
*H01M 6/00* (2006.01)
(Continued)

(52) U.S. Cl.
CPC .............. *H01M 2/145* (2013.01); *H01M 2/164* (2013.01); *H01M 2/1686* (2013.01); *H01M 10/052* (2013.01)

(58) Field of Classification Search
CPC ...... H01M 2/166; H01M 2/162; H01M 2/145
USPC ................... 429/251, 247, 249; 29/623.5
See application file for complete search history.

(56) References Cited

U.S. PATENT DOCUMENTS

2009/0111025 A1 4/2009 Lee et al.
2009/0136846 A1 5/2009 Lee et al.
2009/0291360 A1 11/2009 Kim et al.
(Continued)

FOREIGN PATENT DOCUMENTS

EP 1244158 A1 9/2002
JP 2008287888 11/2008
(Continued)

*Primary Examiner* — Patrick Ryan
*Assistant Examiner* — Julian Anthony
(74) *Attorney, Agent, or Firm* — Dentons US LLP

(57) ABSTRACT

A separator includes a porous substrate, a porous organic-inorganic coating layer formed on at least one surface of the porous substrate, and an organic coating layer formed on the surface of the organic-inorganic coating layer. The porous organic-inorganic coating layer includes a mixture of inorganic particles and a first binder polymer. The first binder polymer contains a copolymer including (a) a first monomer unit including either at least one amine group or at least one amide group or both in the side chain thereof and (b) a (meth)acrylate having a $C_1$-$C_{14}$ alkyl group as a second monomer unit. The organic coating layer is formed by dispersing a second binder polymer on the surface of the organic-inorganic coating layer, leaving scattered uncoated areas.

3 Claims, 5 Drawing Sheets

(51) Int. Cl.
*H01M 2/14* (2006.01)
*H01M 10/052* (2010.01)

(56) References Cited

U.S. PATENT DOCUMENTS

| | | |
|---|---|---|
| 2010/0167124 A1 | 7/2010 | Seo et al. |
| 2010/0291430 A1 | 11/2010 | Lee et al. |
| 2010/0323230 A1 | 12/2010 | Lee et al. |
| 2012/0141877 A1* | 6/2012 | Choi et al. ............ 429/246 |
| 2013/0017429 A1 | 1/2013 | Ha et al. |

FOREIGN PATENT DOCUMENTS

| | | |
|---|---|---|
| JP | 2011512005 A | 4/2011 |
| KR | 10-2006-0063751 | 6/2006 |
| KR | 10-2007-0082578 | 8/2007 |
| KR | 10-2009-0051546 | 5/2009 |
| KR | 10-2009-0055305 | 6/2009 |
| TW | 519777 | 2/2003 |
| TW | 200640674 | 12/2006 |
| WO | WO 2011/115376 A2 | 9/2011 |

* cited by examiner

SEPARATOR, METHOD FOR PRODUCING THE SAME AND ELECTROCHEMICAL DEVICE INCLUDING THE SAME

CROSS-REFERENCE TO RELATED APPLICATION

The present application is a continuation of International Application No. PCT/KR2012/001099 filed on Feb. 14, 2012, which claims priority to Korean Patent Application No. 10-2011-0013312 filed on Feb. 15, 2011, and Korean Patent Application No. 10-2012-0013889 filed on Feb. 10, 2012 in the Republic of Korea, the disclosures of which are incorporated herein by reference.

TECHNICAL FIELD

The present disclosure relates to a separator for an electrochemical device such as a lithium secondary battery, a method for producing the separator, and an electrochemical device including the separator. More specifically, the present disclosure relates to a separator including a porous organic-inorganic coating layer composed of a mixture of inorganic particles and a binder polymer on a porous substrate, and an electrochemical device including the separator.

BACKGROUND ART

Recently, there has been growing interest in energy storage technologies. As the application fields of energy storage technologies have been extended to mobile phones, camcorders, notebook computers and even electric cars, efforts have increasingly been made towards the research and development of electrochemical devices. In this aspect, electrochemical devices have attracted the most attention. The development of secondary batteries capable of repeatedly charging and discharging has been the focus of particular interest. In recent years, extensive research and development has been conducted to design new electrodes and batteries for the purpose of improving capacity density and specific energy of the batteries.

Many secondary batteries are currently available. Lithium secondary batteries developed in the early 1990's have received a great deal of attention due to their advantages of higher operating voltages and much higher energy densities than conventional batteries using aqueous electrolyte solutions, such as Ni—MH batteries, Ni—Cd batteries and $H_2SO_4$—Pb batteries. However, such lithium ion batteries suffer from safety problems, such as fire or explosion, encountered with the use of organic electrolytes and are disadvantageously complicated to fabricate. In attempts to overcome the disadvantages of lithium ion batteries, lithium ion polymer batteries have been developed as next-generation batteries. However, additional research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, safety regulations strictly prohibit the dangers (such as fire and smoke) of electrochemical devices. In connection with the safety characteristics of a lithium secondary battery including a separator, overheating of the lithium secondary battery may cause thermal runaway or puncture of the separator may pose an increased risk of explosion. In particular, a porous polyolefin substrate commonly used as a separator of a lithium secondary battery undergoes extreme thermal shrinkage at a temperature of 100° C. or higher due to its material characteristics and production processes including elongation. This thermal shrinkage behavior may cause short circuits between a cathode and an anode.

Various proposals have been made to solve the above safety problems of electrochemical devices. For example, Korean Unexamined Patent Publication No. 10-2007-231 discloses a separator which includes a porous organic-inorganic coating layer formed by coating a mixture of inorganic particles and a binder polymer on at least one surface of a porous substrate. The inorganic particles present in the porous organic-inorganic coating layer coated on the porous substrate serve as spacers that can maintain a physical shape of the porous organic-inorganic coating layer to inhibit the porous substrate from thermal shrinkage when an electrochemical device overheats. Cavities present between the inorganic particles form fine pores of the porous coating layer.

The inorganic particles should be present in an amount above a predetermined level in order to allow the porous organic-inorganic coating layer to inhibit thermal shrinkage of the porous substrate. However, as the content of the inorganic particles increases (that is, as the content of the binder polymer decreases), the bindability of the separator to an electrode may deteriorate and the inorganic particles may be separated from the porous organic-inorganic coating layer when stress occurs during fabrication (e.g., winding) of an electrochemical device by assembly. The separated inorganic particles act as local defects of the electrochemical device, giving a negative influence on the safety of the electrochemical device. Thus, there is a need to develop a binder polymer that can enhance the bindability of a porous organic-inorganic coating layer to a porous substrate. There is also a need to improve the bindability of a porous organic-inorganic coating layer to an electrode.

On the other hand, a porous organic-inorganic coating layer having a low packing density should be formed to a large thickness so as to perform its functions. This acts as an obstacle to the production of a thin separator essential to enhance the capacity of an electrochemical device.

DISCLOSURE

Technical Problem

The present disclosure is designed to solve the problems of the prior art, and therefore it is an object of the present disclosure to provide a separator including a porous organic-inorganic coating layer whose packing density is high enough to realize the fabrication of a thin battery in an easy manner without losing stability and whose ability to bind to a porous substrate and an electrode is improved, and an electrochemical device including the separator.

It is another object of the present disclosure to provide a method for producing the separator in an easy manner.

Technical Solution

According to an aspect of the present disclosure, there is provided a separator including:
a porous substrate;
a porous organic-inorganic coating layer formed on at least one surface of the porous substrate and including a mixture of inorganic particles and a first binder polymer, the first binder polymer containing a copolymer including (a) a first monomer unit including either at least one amine group or at least one amide group or both in the side chain thereof and (b) a (meth)acrylate having a $C_1$-$C_{14}$ alkyl group as a second monomer unit; and an organic coating layer formed by dispersing a second binder polymer on the surface of the organic-inorganic coating layer, leaving scattered uncoated areas.

The first monomer unit and the second monomer unit are preferably present in amounts of 10 to 80% and 20 to 90% by mole, respectively, based on the total moles of all constituent monomer units of the copolymer.

As the first monomer unit, there may be used, for example, 2-(((butoxyamino)carbonyl)oxy)ethyl (meth)acrylate, 2-(diethylamino)ethyl (meth)acrylate, 2-(dimethylamino)ethyl (meth)acrylate, 3-(diethylamino)propyl (meth)acrylate, 3-(dimethylamino)propyl (meth)acrylate, methyl 2-acetamido(meth)acrylate, 2-(meth)acrylamidoglycolic acid, 2-(meth) acrylamido-2-methyl-1-propanesulfonic acid, (3-(meth)acrylamidopropyl)trimethylammonium chloride, N-(meth)acryloylamido-ethoxyethanol, 3-(meth)acryloylamino-1-propanol, N-(butoxymethyl)(meth)acrylamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl) (meth)acrylamide, N,N'-(1,3-phenylene)dimaleimide, N,N'-(1,4-phenylene)dimaleimide, N,N'-(1,2-dihydroxyethylene) bisacrylamide, N,N'-ethylenebis(meth)acrylamide or N-vinylpyrrolidinone. These monomer units may be used alone or as a mixture of two or more thereof. As the second monomer unit, there may be used, for example, methyl (meth) acrylate, ethyl (meth)acrylate, n-propyl (meth)acrylate, isopropyl (meth)acrylate, n-butyl (meth)acrylate, t-butyl (meth) acrylate, sec-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate or tetradecyl (meth) acrylate. These monomer units may be used alone or as a mixture of two or more thereof.

Preferably, the copolymer further includes (c) a third monomer unit including at least one cyano group. The third monomer unit is present in an amount of 5 to 50% by mole, based on the total moles of all constituent monomer units of the copolymer.

Preferably, the copolymer further includes a monomer unit having at least one crosslinkable functional group by which the other monomer units are crosslinked with each other.

The first binder polymer is preferably present in an amount of 2 to 30 parts by weight, based on 100 parts by weight of the inorganic particles. In the porous organic-inorganic coating layer, the first binder polymer forms coating layers partially or entirely surrounding the surfaces of the inorganic particles. The inorganic particles are in close contact with and are connected and fixed to each other through the coating layers. Cavities present between the inorganic particles form pores of the porous organic-inorganic coating layer.

The porous organic-inorganic coating layer preferably has a packing density D satisfying the inequality: $0.40 \times D_{inorg} \leq D \leq 0.70 \times D_{inorg}$ where D is $(Sg-Fg)/(St-Et)$, Sg is the weight (g) per unit area (m$^2$) of the separator in which the porous organic-inorganic coating layer is formed on the porous substrate, Fg is the weight (g) of the unit area (m$^2$) of the porous substrate, St is the thickness (μm) of the separator in which the porous organic-inorganic coating layer is formed on the porous substrate, Ft is the thickness (μm) of the porous substrate, and $D_{inorg}$ is the density (g/m$^2 \times$μm) of the inorganic particles used.

The second binder polymer has a solubility parameter different from that of the first binder polymer. The difference in solubility parameter between the first and second binder polymers is preferably at least 4 $(J/cm^3)^{0.5}$, more preferably at least 8 $(J/cm^3)^{0.5}$. As the second binder polymer, there may be used, for example, polyvinylidene fluoride-hexafluoropropylene, polyvinylidene fluoride-trichloroethylene, polyacrylonitrile or polyvinylpyrrolidone. These binder polymers may be used alone or as a mixture of two or more thereof.

Preferably, the organic coating layer covers 5 to 80% of the entire surface area of the organic-inorganic coating layer. The area of the organic coating layer is more preferably from 10 to 60% of the entire surface area of the organic-inorganic coating layer.

According to another aspect of the present disclosure, there is provided a method for producing a separator, including:

(S1) preparing a porous substrate;

(S2) dispersing inorganic particles and dissolving a first binder polymer in a solvent to prepare a slurry, the first binder polymer containing a copolymer including (a) a first monomer unit including either at least one amine group or at least one amide group or both in the side chain thereof and (b) a (meth)acrylate having a $C_1$-$C_{14}$ alkyl group as a second monomer unit, coating the slurry on at least one surface of the porous substrate, and drying the slurry to form a porous organic-inorganic coating layer; and (S3) coating a solution of 0.2 to 2.0% by weight of a second binder polymer on the organic-inorganic coating layer, and drying the polymer solution.

According to yet another aspect of the present disclosure, there is provided an electrochemical device including a cathode, an anode and the separator interposed between the two electrodes. The electrochemical device may be, for example, a lithium secondary battery or a supercapacitor.

Advantageous Effects

As is apparent from the foregoing, the porous organic-inorganic coating layer of the separator according to the present disclosure has a high packing density and good ability to bind to the porous substrate. Therefore, the separator of the present disclosure has a reduced resistance and can be used to fabricate a thin electrochemical device in an easy manner without losing stability, which contributes to an enhanced capacity of the electrochemical device. In addition, the separator of the present disclosure is highly resistant to thermal and mechanical impact, which prevents the inorganic particles from separating from the porous organic-inorganic coating layer. The organic coating layer has uncoated areas scattered on the surface of the organic-inorganic coating layer. This structure can enhance the bindability of the separator to an electrode without a substantial increase in resistance.

DESCRIPTION OF DRAWINGS

The accompanying drawings, which are incorporated in and form a part of the specification, illustrate preferred embodiments of the present disclosure and, together with the detailed description of the preferred embodiments, serve to explain the principles of the present disclosure. In the drawings.

BEST MODE

Figure 1:
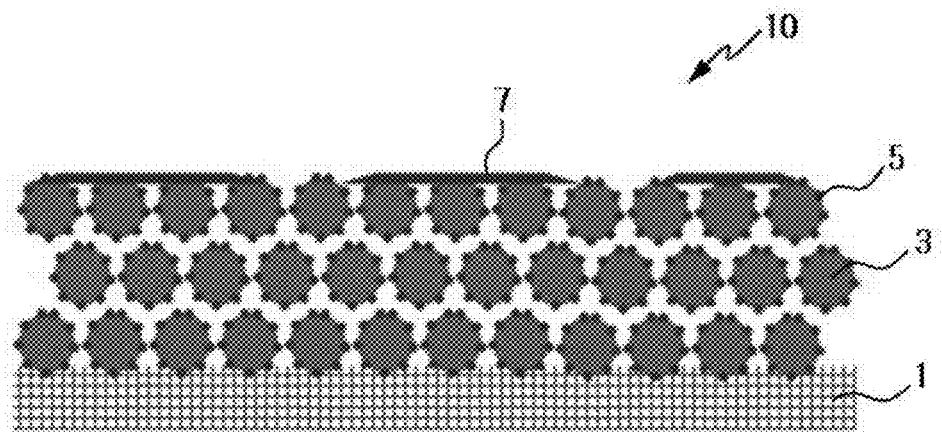
FIG. 1 is a cross-sectional view schematically illustrating a separator of the present disclosure.
Figure 2:
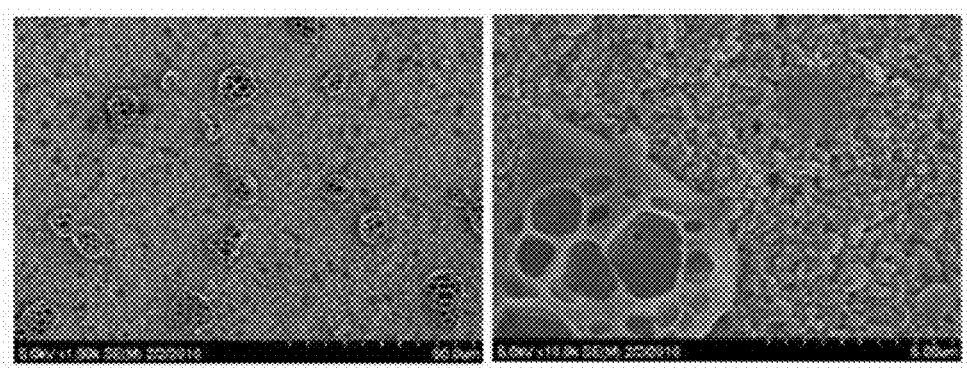
FIG. 2 is a SEM image showing the surface of a separator produced in Example 1.
Figure 3:
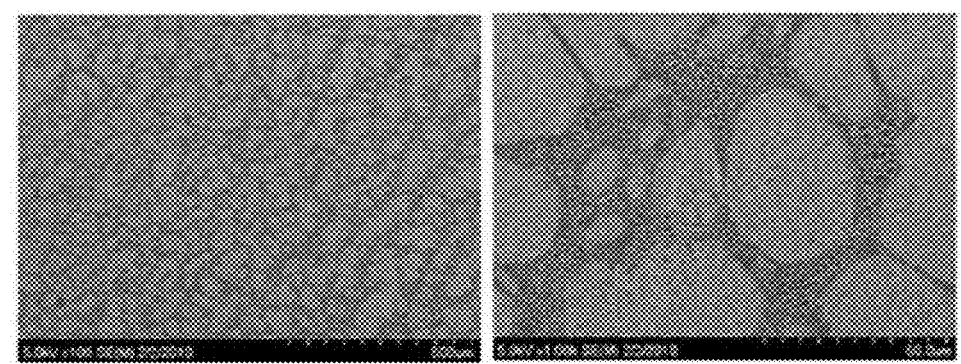
FIG. 3 is a SEM image showing the surface of a separator produced in Example 2.
Figure 4:
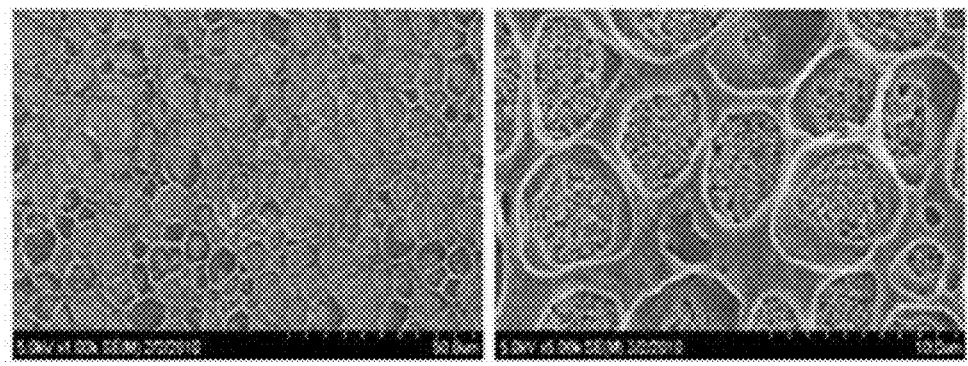
FIG. 4 is a SEM image showing the surface of a separator produced in Example 3.
Figure 5:
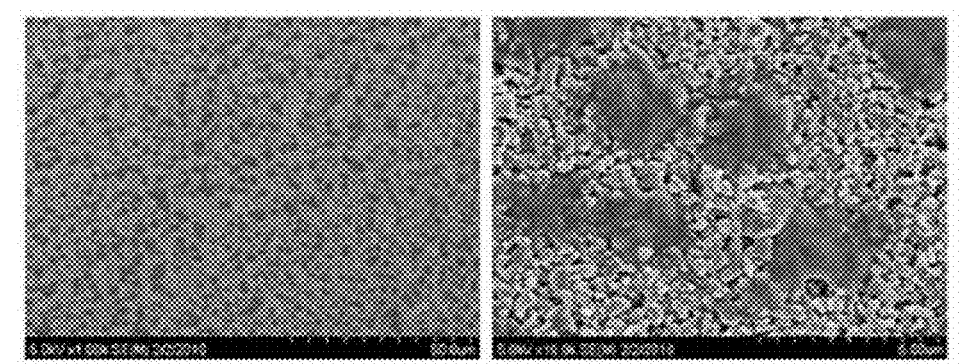
FIG. 5 is a SEM image showing the surface of a separator produced in Example 4.
Figure 6:
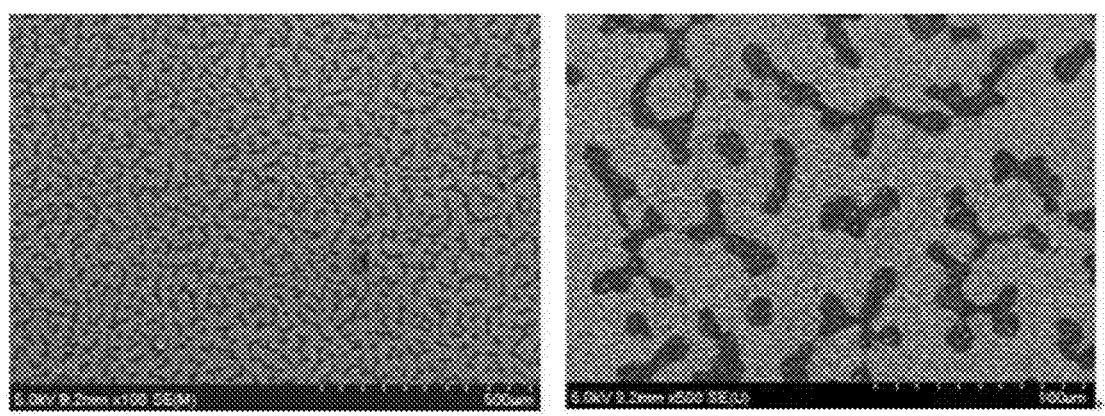
FIG. 6 is a SEM image showing the surface of a separator produced in Example 5.
Figure 7:
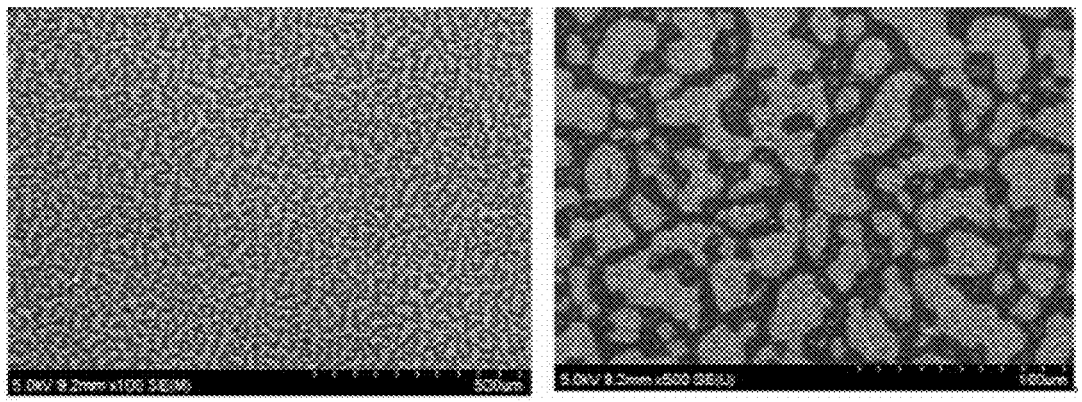
FIG. 7 is a SEM image showing the surface of a separator produced in Example 6.
Figure 8:
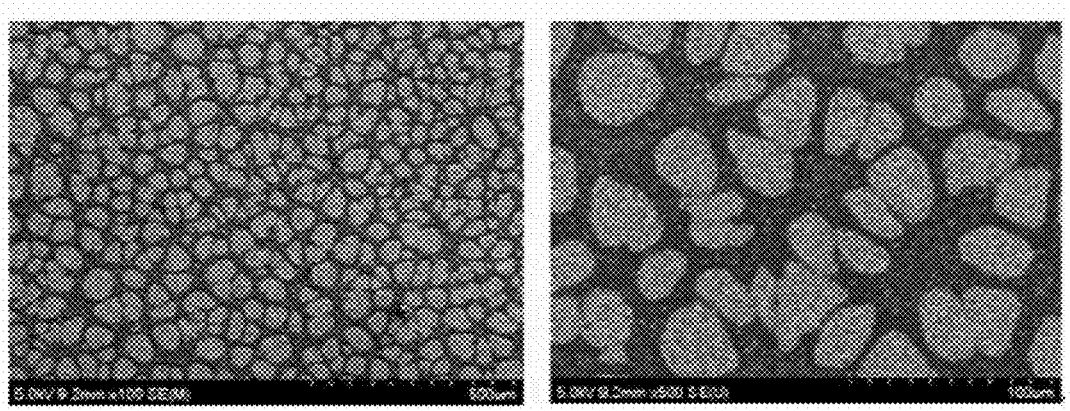
FIG. 8 is a SEM image showing the surface of a separator produced in Example 7.
Figure 9:
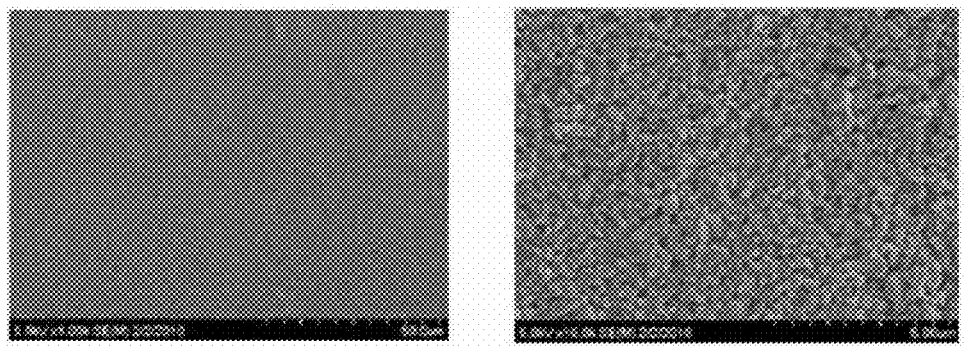
FIG. 9 is a SEM image showing the surface of a separator produced in Comparative Example 1.
Figure 10:
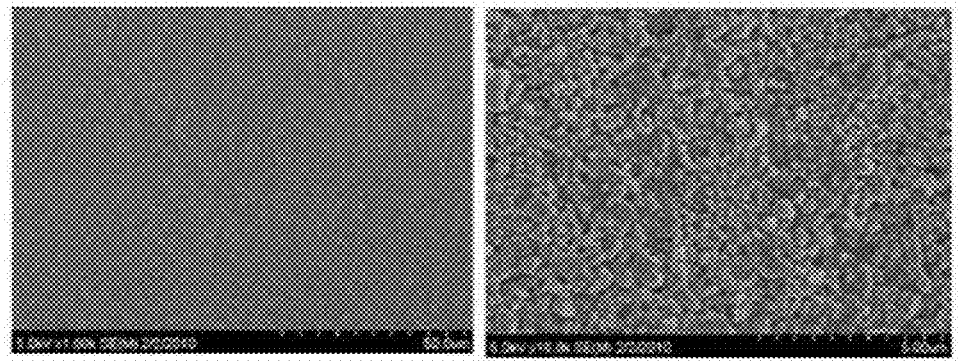
FIG. 10 is a SEM image showing the surface of a separator produced in Comparative Example 2.
Figure 11:
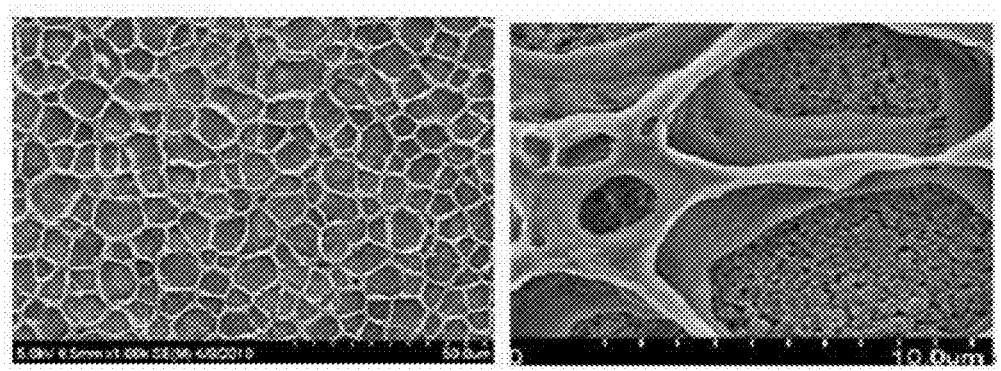
FIG. 11 is a SEM image showing the surface of a separator produced in Comparative Example 3.
Figure 12:
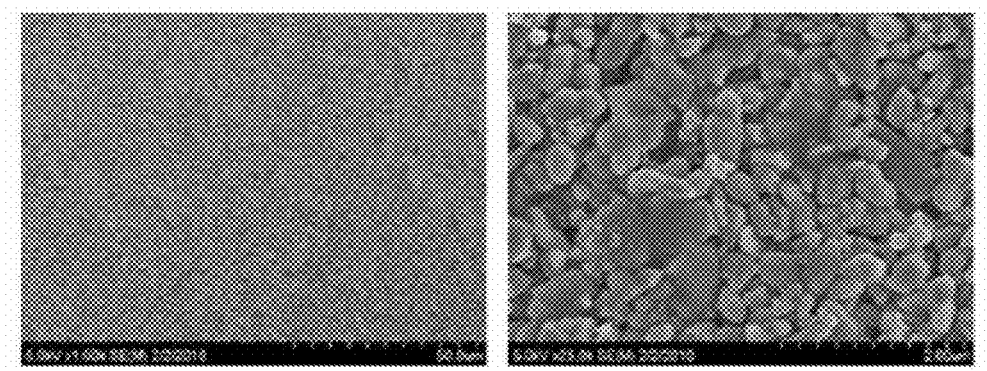
FIG. 12 is a SEM image showing the surface of a separator produced in Comparative Example 4.
Figure 13:
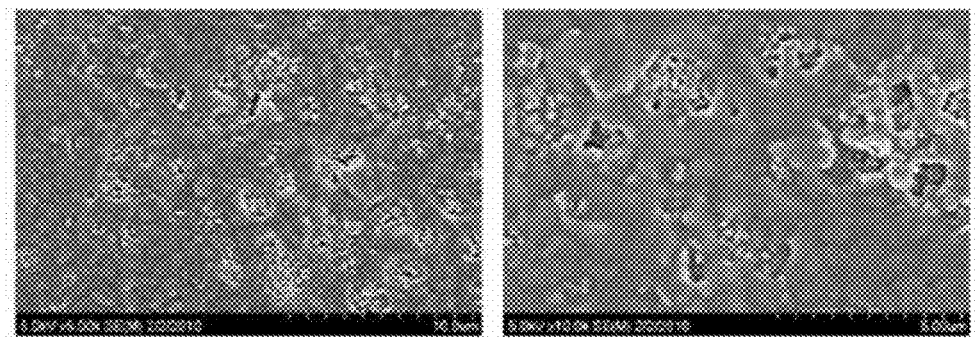
FIG. 13 is a SEM image showing the surface of a separator produced in Comparative Example 5.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure at the time of filing the present application.

The present disclosure provides a separator including a porous substrate, and a porous organic-inorganic coating layer formed on at least one surface of the porous substrate and including a mixture of inorganic particles and a first binder polymer. The first binder polymer used to form the porous organic-inorganic coating layer contains a copolymer including (a) a first monomer unit including either at least one amine group or at least one amide group or both in the side chain thereof and (b) a (meth)acrylate having a $C_1$-$C_{14}$ alkyl group as a second monomer unit. The copolymer can be represented by (the first monomer unit)$_m$-(the second monomer unit)$_n$ (wherein 0<m<1 and 0<n<1). There is no restriction on the arrangement of the first and second monomer units in the copolymer. For example, the first and second monomer units may be arranged randomly or in blocks.

The first and second monomer units serve to provide a good binding between the inorganic particles or between the inorganic particles and the porous substrate. The porous organic-inorganic coating layer formed using the first and second monomer units has few defects and a high packing density. Therefore, the use of the separator according to the present disclosure facilitates the fabrication of a thin battery. In addition, the separator of the present disclosure is highly stable against external impact and is prevented from separation of the inorganic particles.

As the first monomer unit including either at least one amine group or at least one amide group or both in the side chain thereof, there may be used, for example, 2-(((butoxyamino)carbonyl)oxy)ethyl (meth)acrylate, 2-(diethylamino)ethyl (meth)acrylate, 2-(dimethylamino)ethyl (meth)acrylate, 3-(diethylamino)propyl (meth)acrylate, 3-(dimethylamino)propyl (meth)acrylate, methyl 2-acetamido(meth)acrylate, 2-(meth)acrylamidoglycolic acid, 2-(meth) acrylamido-2-methyl-1-propanesulfonic acid, (3-(meth)acrylamidopropyl)trimethylammonium chloride, N-(meth)acryloylamido-ethoxyethanol, 3-(meth)acryloylamino-1-propanol, N-(butoxymethyl)(meth)acrylamide, N-tert-butyl(meth)acrylamide, diacetone(meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl) (meth)acrylamide, N,N'-(1,3-phenylene)dimaleimide, N,N'-(1,4-phenylene)dimaleimide, N,N'-(1,2-dihydroxyethylene) bisacrylamide, N,N'-ethylenebis(meth)acrylamide or N-vinylpyrrolidinone. These monomer units may be used alone or as a mixture of two or more thereof. The first monomer unit is preferably an acrylic monomer unit.

As the (meth)acrylate having a $C_1$-$C_{14}$ alkyl group as a second monomer unit, there may be used, for example, methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylbutyl (meth)acrylate, 2-ethylhexyl (meth)acrylate, n-octyl (meth)acrylate, isooctyl (meth)acrylate, isononyl (meth)acrylate, lauryl (meth)acrylate or tetradecyl (meth)acrylate. These monomer units may be used alone or as a mixture of two or more thereof. If the number of carbon atoms included in the alkyl group of the second monomer unit is greater than 14, an increase in non-polarity may appear due to the long alkyl chain, leading to a reduction in the packing density of the porous organic-inorganic coating layer.

The first monomer unit is preferably present in an amount of 10 to 80% by mole, more preferably 15 to 80% by mole, based on the total moles of all constituent monomer units of the copolymer. The presence of the first monomer unit in an amount of less than 10% by mole may deteriorate the packing density and binding force of the porous organic-inorganic coating layer. Meanwhile, the presence of the first monomer unit in an amount of more than 80% by mole may cause an excessive increase in the packing density of the porous organic-inorganic coating layer, leading to an excessively high electrical resistance. The second monomer unit is preferably present in an amount of 20 to 90% by mole, based on the total moles of all constituent monomer units of the copolymer. The presence of the second monomer unit in an amount of less than 20% by mole may deteriorate the binding to the porous substrate. Meanwhile, the presence of the second monomer unit in an amount of more than 90% by mole may deteriorate the packing properties of the copolymer in the porous organic-inorganic coating layer due to the relatively low content of the first monomer unit.

Preferably, the copolymer further includes (c) a third monomer unit including at least one cyano group. As the third monomer unit, there may be mentioned, for example, ethyl cis-(beta-cyano)(meth)acrylate, (meth)acrylonitrile, 2-(vinyloxy)ethanenitrile, 2-(vinyloxy)propanenitrile, cyanomethyl (meth)acrylate, cyanoethyl (meth)acrylate or cyanopropyl (meth)acrylate. The third monomer unit is preferably present in an amount of 5 to 50% by mole, based on the total moles of all constituent monomer units of the copolymer.

Preferably, the copolymer further includes a monomer unit having at least one crosslinkable functional group by which the other monomer units are crosslinked with each other. As the crosslinkable functional group, there may be exemplified a hydroxyl group, a primary amine group, a secondary amine group, an acid group, an epoxy group, an oxetane group, an imidazole group or an oxazoline group. The copolymer may be further copolymerized with the monomer having at least one crosslinkable functional group, followed by crosslinking. The crosslinking may be performed by the addition of a curing agent, such as isocyanate compound, an epoxy compound, an oxetane compound, an aziridine compound or a metal chelating agent. For example, the monomer having at least one crosslinkable functional group may be used in an amount of 1 to 20% by mole.

The copolymer may further include one or more other monomer units so long as the objects of the present disclosure are not impaired. For example, the copolymer may be further copolymerized with at least one (meth)acrylic acid alkylene oxide adduct to improve the ionic conductivity of the separator. Examples of suitable (meth)acrylic acid alkylene oxide adducts include $C_1$-$C_8$ alkoxy diethylene glycol (meth) acrylic acid ester, alkoxy triethylene glycol (meth)acrylic acid ester, alkoxy tetraethylene glycol (meth)acrylic acid ester, phenoxy diethylene glycol (meth)acrylic acid ester, alkoxy dipropylene glycol (meth)acrylic acid ester, alkoxy tripropylene glycol (meth)acrylic acid ester and phenoxy dipropylene glycol (meth)acrylic acid ester.

It will be obvious to those skilled in the art that the first binder polymer may be combined with at least one binder polymer other than the above-mentioned copolymer so long as the objects of the present disclosure are not impaired.

The inorganic particles used to form the porous organic-inorganic coating layer of the separator according to the present disclosure are not specially limited so long as they are electrochemically stable. In other words, the inorganic particles can be used without particular limitation in the present disclosure if they do not undergo oxidation and/or reduction in an operating voltage range applied to an electrochemical device (for example, 0-5 V for $Li/Li^+$). In particular, the use of inorganic particles having the ability to transportions can improve the conductivity of ions in an electrochemical device, leading to an improvement in the performance of the electrochemical device.

The use of inorganic particles having a high dielectric constant can contribute to an increase in the degree of dissociation of an electrolyte salt, for example, a lithium salt, in a liquid electrolyte to improve the ionic conductivity of the electrolyte solution.

For these reasons, it is preferred that the inorganic particles are selected from inorganic particles having a dielectric constant of at least 5, preferably at least 10, inorganic particles having the ability to transport lithium ions, and mixtures thereof. Non-limiting examples of inorganic particles having a dielectric constant of at least 5 include $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $SiC$ and $TiO_2$ particles. These inorganic particles may be used alone or as a mixture thereof.

Particularly preferred are $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$(PMN-PT) and hafnia ($HfO_2$) whose dielectric constants are 100 or higher that have piezoelectricity to protect both electrodes from internal short circuits when an external impact is applied, ensuring improved safety of an electrochemical device. Piezoelectricity is a phenomenon in which charges are created as a result of tension or compression under a certain pressure to generate a potential difference between opposite sides. The use of a mixture of the inorganic particles having a high dielectric constant and the inorganic particles having the ability to transport lithium ions can produce enhanced synergistic effects.

The inorganic particles having the ability to transport lithium ions refer to those that contain lithium atoms and have the function of transferring lithium ions without storing the lithium. The inorganic particles having the ability to transport lithium ions contain defects in their structure through which lithium ions can be transferred and moved. The presence of the defects can improve the conductivity of lithium ions in a battery, leading to improved battery performance. Non-limiting examples of the inorganic particles having the ability to transport lithium ions include lithium phosphate ($Li_3PO_4$) particles, lithium titanium phosphate ($Li_xTi_y(PO_4)_3$, $0<x<2$, $0<y<3$) particles, lithium aluminum titanium phosphate ($Li_xAl_yTi_z(PO_4)_3$, $0<x<2$, $0<y<1$, $0<z<3$) particles, $(LiAlTiP)_xO_y$ type glass ($0<x<4$, $0<y<13$) particles such as $14Li_2O$-$9Al_2O_3$-$38TiO_2$-$39P_2O_5$ particles, lithium lanthanum titanate ($Li_xLa_yTiO_3$, $0<x<2$, $0<y<3$) particles, lithium germanium thiophosphate ($Li_xGe_yP_zS_w$, $0<x<4$, $0<y<1$, $0<z<1$, $0<w<5$) particles such as $Li_{3.25}Ge_{0.25}P_{0.75}S_4$ particles, lithium nitride ($Li_xN_y$, $0<x<4$, $0<y<2$) particles such as $Li_3N$ particles, $SiS_2$ type glass ($Li_xSi_yS_z$, $0<x<3$, $0<y<2$, $0<z<4$) particles such as $Li_3PO_4$—$Li_2S$—$SiS_2$ particles, and $P_2S_5$ type glass ($Li_xP_yS_z$, $0<x<3$, $0<y<3$, $0<z<7$) particles such as $LiI$—$Li_2S$—$P_2S_5$ particles. These inorganic particles may be used alone or as a mixture thereof.

The size of the inorganic particles included in the porous organic-inorganic coating layer is not limited but is preferably in the range of 0.001 to 10 μm. Within this range, a uniform thickness and an optimal porosity of the coating layer can be obtained. If the size of the inorganic particles is smaller than 0.001 μm, the dispersibility of the inorganic particles may deteriorate, which makes it difficult to control the physical properties of the separator. Meanwhile, if the size of the inorganic particles is larger than 10 μm, the thickness of the porous organic-inorganic coating layer is increased, which may deteriorate the mechanical properties of the separator, and the pore size is excessively increased, which may increase the probability that internal short circuits will be caused during charging and discharging of a battery.

The content of the first binder polymer in the porous organic-inorganic coating layer of the separator according to the present disclosure is preferably from 2 to 30 parts by weight, more preferably from 5 to 15 parts by weight, based on 100 parts by weight of the inorganic particles. The presence of the first binder polymer in an amount of less than 2 parts by weight may cause separation of the inorganic particles from the porous organic-inorganic coating layer. Meanwhile, the presence of the binder polymer in an amount exceeding 30 parts by weight may cause clogging of the pores of the porous substrate, leading to an increase in resistance, and may reduce the porosity of the porous organic-inorganic coating layer.

Preferably, the porous organic-inorganic coating layer formed on the porous substrate has a structure in which the first binder polymer forms coating layers partially or entirely surrounding the surfaces of the inorganic particles, the inorganic particles are in close contact with and are connected and fixed to each other through the coating layers, and cavities present between the inorganic particles form pores. That is, the inorganic particles are in close contact with each other and cavities present between the inorganic particles in close contact with each other become pores of the porous organic-inorganic coating layer.

For high packing density, it is preferred that the size of the cavities present between the inorganic particles is equal to or smaller than the average particle diameter of the inorganic particles. The first binder polymer forming coating layers partially or entirely surrounding the surfaces of the inorganic particles connects and fixes the inorganic particles to each other. In addition, the inorganic particles in contact with the porous substrate are fixed to the porous substrate by the first binder polymer.

The packing density D of the porous organic-inorganic coating layer can be defined as the density of the porous organic-inorganic coating layer loaded at a height of 1 µm from the porous substrate per unit area (m²) of the porous substrate. The packing density D preferably satisfies the following inequality:

$$0.40 \times D_{inorg} \leq D \leq 0.70 \times D_{inorg}$$

where D is (Sg−Fg)/(St−Et), Sg is the weight (g) per unit area (m²) of the separator in which the porous organic-inorganic coating layer is formed on the porous substrate, Fg is the weight (g) of the unit area (m²) of the porous substrate, St is the thickness (µm) of the separator in which the porous organic-inorganic coating layer is formed on the porous substrate, Ft is the thickness (µm) of the porous substrate, and $D_{inorg}$ is the density (g/m²×µm) of the inorganic particles used. When two or more kinds of inorganic particles are used, $D_{inorg}$ is determined taking into consideration the densities and fractions of the individual kinds of inorganic particles.

If the packing density D is below the lower limit, the porous organic-inorganic coating layer becomes structurally loose, posing a risk that the porous organic-inorganic coating layer may lose its function to suppress thermal shrinkage of the porous substrate and its resistance to mechanical impact may also deteriorate. Meanwhile, if the packing density D is above the upper limit, the increased packing density may bring about an improvement in the physical properties of the porous organic-inorganic coating layer but the decreased porosity of the porous organic-inorganic coating layer may deteriorate the electrical conductivity of the separator.

The thickness of the porous organic-inorganic coating layer composed of the inorganic particles and the first binder polymer is not specifically limited but is preferably in the range of 0.5 to 10 µm.

The porous substrate may be any of those that are commonly used in electrochemical devices. For example, the porous substrate may be made of at least one polymer selected from the group consisting of polyolefin, polyethylene terephthalate, polybutylene terephthalate, polyacetal, polyamide, polycarbonate, polyimide, polyether ether ketone, polyethersulfone, polyphenylene oxide, polyphenylene sulfide and polyethylene naphthalene. The porous substrate may be in the form of a membrane or a non-woven fabric. The thickness of the porous substrate is preferably from 5 to 50 µm but is not particularly limited to this range. The pore size and porosity of the porous substrate are preferably from 0.001 to 50 µm and from 10 to 95%, respectively, but are not particularly limited to these ranges.

The separator includes an organic coating layer formed by dispersing a second binder polymer on the surface of the organic-inorganic coating layer, leaving scattered uncoated areas. The organic coating layer forms the outer surface of the separator but does not completely cover the entire surface of the organic-inorganic coating layer. The uncoated areas, in which the second binder polymer is not coated, are scattered on the surface of the organic-inorganic coating layer. That is, the uncoated areas and the coated areas are dispersed on the surface of the organic-inorganic coating layer. Ions can pass through the uncoated areas scattered on the surface of the organic-inorganic coating layer. Due to this structure, the bindability of the separator to an electrode can be enhanced without a substantial increase in resistance.

Since the second binder polymer constituting the organic coating layer is different from the first binder polymer constituting the organic-inorganic coating layer, the two binder polymers have different solubility parameters. The first and second binder polymers may be copolymers having the same kinds of monomers. Even in this case, since the first and second binder polymers include different amounts of the monomers, they have different solubility parameters. The first and second binder polymers may be composed of mixtures of the same two kinds of polymers. Even in this case, since the first and second binder polymers include different amounts of the polymers, they have different solubility parameters.

The difference in solubility parameter between the first and second binder polymers is preferably at least 4 $(J/cm^3)^{0.5}$, more preferably at least 8 $(J/cm^3)^{0.5}$. Examples of polymers suitable for use as the second binder polymer include, but are not limited to, polyvinylidene fluoride-hexafluoropropylene, polyvinylidene fluoride-trichloroethylene, polyacrylonitrile and polyvinylpyrrolidone. These polymers may be used alone or as a mixture of two or more thereof.

Taking both the bindability of the separator to an electrode and the resistance of the separator into account, it is preferred that the organic coating layer covers 5 to 80% of the entire surface area of the organic-inorganic coating layer. The area of the organic coating layer is more preferably from 10 to 60% of the entire surface area of the organic-inorganic coating layer. The thickness of the organic coating layer is preferably from 0.1 to 2 µm, more preferably from 0.1 to 1 µm.

FIG. 1 is a cross-sectional view schematically illustrating the separator of the present disclosure, which includes the elements described above. In the separator 10 illustrated in FIG. 1, the porous organic-inorganic coating layer is formed on the porous substrate 1 and includes the inorganic particles 3 and the first binder polymer 5. The organic coating layer 7 is formed by dispersing the second binder polymer on the surface of the organic-inorganic coating layer, leaving scattered uncoated areas.

The present disclosure also provides a method for producing the separator. The method is preferably carried out by the following procedure.

First, a porous substrate is prepared (S1). The kind of the porous substrate is as described above.

Subsequently, a copolymer including a first monomer unit and a second monomer unit is prepared and is dissolved alone or in combination with one or more other binder polymers in a solvent to prepare a solution of a first binder polymer. Inorganic particles are added to and dispersed in the first binder polymer solution. The solvent preferably has a solubility parameter similar to that of the first binder polymer and has a low boiling point, which are advantageous for uniform mixing and ease of solvent removal. Non-limiting examples of solvents usable to dissolve the copolymer include acetone, tetrahydrofuran, methylene chloride, chloroform, dimethylformamide, N-methyl-2-pyrrolidone (NMP), cyclohexane, and water. These solvents may be used alone or as a mixture thereof. It is preferred to crush the inorganic particles after addition to the first binder polymer solution. At this time, the crushing is suitably performed for 1 to 20 hr. The inorganic particles are preferably crushed to a particle size of 0.001 to 10 μm. The inorganic particles may be crushed by any suitable technique known in the art. Ball milling is particularly preferred.

The first binder polymer solution containing the inorganic particles dispersed therein is coated on the porous substrate and dried to form a porous organic-inorganic coating layer (S2). The coating is preferably performed at a humidity of 10 to 80%. Any drying process for evaporating the solvent may be employed, such as hot-air drying.

The binder polymer solution containing the inorganic particles dispersed therein may be coated on the porous substrate by a suitable technique known in the art, for example, dip coating, die coating, roll coating, comma coating or a combination thereof. The porous organic-inorganic coating layer may be formed on either one or both surfaces of the porous substrate.

Subsequently, 0.2 to 2.0% by weight of a second binder polymer is dissolved in a solvent, coated on the organic-inorganic coating layer, and dried (S3).

The second binder polymer solution may be coated by any of the above-mentioned techniques for coating the first binder polymer solution. The second binder polymer solution coated on the entire surface of the organic-inorganic coating layer is self-assembled on the surface of the organic-inorganic coating layer during solvent evaporation to form an organic coating layer. As described above, the organic coating layer forms the outer surface of the separator but does not completely cover the entire surface of the organic-inorganic coating layer. As a result of the self-assembly, uncoated areas are scattered between the coated areas on the organic-inorganic coating layer. Different solubility parameters of the first and second binder polymers are required to obtain the shape of the organic coating layer. In addition, it is necessary to control the concentration of the second binder polymer solution.

If the second binder polymer solution has the same composition as the first binder polymer solution, it has a high affinity for the organic-inorganic coating layer after coating and drying. Accordingly, a large amount of the second binder polymer solution permeates the pores of the organic-inorganic coating layer, leaving only a slight amount of the second binder polymer on the surface of the organic-inorganic coating layer. If the content of the second binder polymer in the solution is less than 0.2% by weight, the effect of improving the binding to an electrode may be negligible. Meanwhile, if the content of the second binder polymer in the solution exceeds 2.0% by weight, it is difficult to obtain the desired shape of the organic coating layer having uncoated areas. It should, of course, be understood that the concentration of the second binder polymer solution may vary depending on the kind of the second binder polymer.

In view of the foregoing, it is preferred to limit the content of the second binder polymer in the solution to the range defined above, to select the second binder polymer from those described above and to adjust the thickness of the organic coating layer to the range defined above.

Although combinations of the elements described as preferred embodiments have not been particularly disclosed in the specification, it should be understood that combinations of two or more of the elements can be adopted as various constitutions of the present disclosure.

The present disclosure also provides an electrochemical device using the separator. Specifically, the electrochemical device of the present disclosure has a structure in which the separator is interposed between and laminated to a cathode and an anode. The electrochemical device includes all devices in which electrochemical reactions occur. Specific examples of such electrochemical devices include all kinds of primary batteries, secondary batteries, fuel cells, solar cells, and capacitors such as supercapacitors. Particularly preferred are lithium secondary batteries, including lithium metal secondary batteries, lithium ion secondary batteries, lithium polymer secondary batteries and lithium ion polymer secondary batteries.

The electrochemical device can be fabricated by suitable methods known in the art. As an example, the electrochemical device may be fabricated by interposing the separator between a cathode and an anode, assembling the electrode structure, and injecting an electrolyte solution into the electrode assembly.

There is no particular restriction on the production method of the cathode and the anode to be applied together with the separator of the present disclosure. Each of the electrodes can be produced by binding an electrode active material to an electrode current collector by suitable methods known in the art. The cathode active material may be any of those that are commonly used in cathodes of conventional electrochemical devices. Non-limiting examples of particularly preferred cathode active materials include lithiated manganese oxides, lithiated cobalt oxides, lithiated nickel oxides, lithiated iron oxides, and composite oxides thereof. The anode active material may be any of those that are commonly used in anodes of conventional electrochemical devices. Non-limiting examples of particularly preferred anode active materials include lithium, lithium alloys, and lithium intercalation materials, such as carbon, petroleum coke, activated carbon, graphite and other carbon materials. Non-limiting examples of cathode current collectors suitable for use in the cathode include aluminum foils, nickel foils, and combinations thereof. Non-limiting examples of anode current collectors suitable for use in the anode include copper foils, gold foils, nickel foils, copper alloy foils, and combinations thereof.

The electrochemical device of the present disclosure can use an electrolyte solution consisting of a salt and an organic solvent capable of dissolving or dissociating the salt. The salt has a structure represented by $A^+B^-$ wherein $A^+$ is an alkali metal cation, such as $Li^+$, $Na^+$, $K^+$ or a combination thereof, and $B^-$ is an anion, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and γ-butyrolactone. These organic solvents may be used alone or as a mixture thereof.

The electrolyte solution may be injected in any suitable step during fabrication of the battery depending on the manufacturing processes and desired physical properties of a final product. Specifically, the electrolyte solution may be injected before battery assembly or in the final step of battery assembly.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

Preparation of Copolymers

Copolymers having the monomer compositions shown in Table 1 were prepared.

TABLE 1

| Monomer | Copolymer 1 | Copolymer 2 | Copolymer 3 |
|---|---|---|---|
| DMAAm | 40 | 31 | — |
| DMAEA | 20 | 4 | 35 |
| AN | 40 | 15 | 15 |
| EA | — | 46 | 30 |
| BA | — | — | 28 |
| AA | — | 4 | — |
| HBA | — | — | 2 |

In Table 1, the abbreviations DMAAm, DMAEA, AN, EA, BA, AA and HBA mean N,N-dimethylacrylamide, N,N-dimethylaminoethyl acrylate, acrylonitrile, ethyl acrylate, n-butyl acrylate and hydroxybutyl acrylate, respectively.

Examples and Comparative Examples

Separators having the compositions shown in Table 2 were produced by the following procedure.

First, the corresponding copolymer and an epoxy curing agent were dissolved in acetone to prepare a solution of a first binder polymer. To the binder polymer solution were added alumina particles in such an amount that the binder polymer, the curing agent and the inorganic particles were in a weight ratio of 7.15:0.35:92.5. The inorganic particles were crushed to a particle diameter of about 400 nm and dispersed by ball milling for at least 3 hr to prepare a slurry.

The slurry was dip coated on both surfaces of a 12 μm thick porous polyethylene film (porosity=45%), followed by drying to form organic-inorganic coating layers.

Subsequently, PVdF-HFP polymers having different HFP contents were dissolved in acetone to have the concentrations shown in Table 2. Each of the solutions was dip coated on the porous film on which the organic-inorganic coating layers had been formed, followed by drying to form organic coating layers.

The separator was cut into a specimen having a size of 50 mm×50 mm. The air permeability of the specimen and the packing density D of the organic-inorganic coating layer were measured. The results are shown in Table 3.

The air permeability was evaluated as the time taken for 100 ml air to completely pass through the specimen.

The thermal shrinkage of the specimen in the machine direction was measured after storage at 150° C. for 1 hr.

After the specimen was fixed to a glass plate by using a double-sided tape, a transparent tape (3M) was fixedly attached to the exposed porous organic-inorganic coating layer. The force (gf/15 mm) needed for peeling the tape was measured using a tensile tester and was defined as the adhesive strength of the separator.

TABLE 2

| | Organic-inorganic coating layer | | | | Organic coating layer | | |
|---|---|---|---|---|---|---|---|
| | Thickness of porous film before coating (μm) | Thickness after formation of coating layer (μm) | Copolymer used | Packing density (D) | HFP content of PVdF-HFP copolymer | Concentration of polymer solution (wt %) | Total thickness of separator (μm) |
| Example 1 | 12 ± 0.5 | 16 ± 0.5 | Copolymer 1 | 0.58 × $D_{inorg}$ | 6 mole % | 0.5 | 16.0 ± 0.5 |
| Example 2 | 12 ± 0.5 | 16 ± 0.5 | Copolymer 2 | 0.55 × $D_{inorg}$ | 6 mole % | 1.0 | 16.0 ± 0.5 |
| Example 3 | 12 ± 0.5 | 16 ± 0.5 | Copolymer 3 | 0.57 × $D_{inorg}$ | 6 mole % | 2.0 | 17.0 ± 0.5 |
| Example 4 | 12 ± 0.5 | 16 ± 0.5 | Copolymer 2 | 0.55 × $D_{inorg}$ | 15 mole % | 0.5 | 16.0 ± 0.5 |
| Example 5 | 12 ± 0.5 | 16 ± 0.5 | Copolymer 2 | 0.55 × $D_{inorg}$ | 15 mole % | 1.0 | 16.0 ± 0.5 |
| Example 6 | 12 ± 0.5 | 16 ± 0.5 | Copolymer 2 | 0.55 × $D_{inorg}$ | 15 mole % | 1.5 | 16.0 ± 0.5 |
| Example 7 | 12 ± 0.5 | 16 ± 0.5 | Copolymer 2 | 0.55 × $D_{inorg}$ | 15 mole % | 2.0 | 16.3 ± 0.5 |
| Comparative Example 1 | 12 ± 0.5 | 16 ± 0.5 | Copolymer 2 | 0.55 × $D_{inorg}$ | — | — | 16.0 ± 0.5 |
| Comparative Example 2 | 12 ± 0.5 | 16 ± 0.5 | Copolymer 1 | 0.58 × $D_{inorg}$ | 6 mole % | 0.1 | 16.0 ± 0.5 |
| Comparative Example 3 | 12 ± 0.5 | 16 ± 0.5 | Copolymer 2 | 0.55 × $D_{inorg}$ | 6 mole % | 2.5 | 18.0 ± 0.5 |
| Comparative Example 4 | 12 ± 0.5 | 16 ± 0.5 | Copolymer 2 | 0.55 × $D_{inorg}$ | 15 mole % | 0.1 | 16.0 ± 0.5 |
| Comparative Example 5 | 12 ± 0.5 | 16 ± 0.5 | Copolymer 2 | 0.55 × $D_{inorg}$ | 15 mole % | 2.5 | 17.0 ± 0.5 |
| Comparative Example 6 | 12 ± 0.5 | 16 ± 0.5 | Copolymer 2 | 0.55 × $D_{inorg}$ | Copolymer 2 | 1.0 | 16.5 ± 0.5 |
| Comparative Example 7 | 12 ± 0.5 | 16 ± 0.5 | PVdF-HFP (6 mole %) | 0.38 × $D_{inorg}$ | 6 mole % | 1.0 | 16.5 ± 0.5 |

TABLE 3

Physical properties of separators

|  | Total thickness (μm) | Air permeability (s/100 ml) | Electrical resistance of coin cell (ohm) | Adhesive strength (gf/15 mm) | Lamination force (gf/15 mm) | MD thermal shrinkage (%) |
|---|---|---|---|---|---|---|
| Example 1 | 16.0 ± 0.5 | 342-362 | 0.92-1.05 | 33-52 | 15-22 | <8 |
| Example 2 | 16.0 ± 0.5 | 346-353 | 0.93-1.07 | 32-48 | 19-25 | <8 |
| Example 3 | 17.0 ± 0.5 | 344-459 | 0.92-1.05 | 32-45 | 23-26 | <8 |
| Example 4 | 16.0 ± 0.5 | 345-356 | 0.93-1.04 | 30-52 | 15-19 | <8 |
| Example 5 | 16.0 ± 0.5 | 343-367 | 0.92-1.09 | 32-44 | 18-23 | <8 |
| Example 6 | 16.0 ± 0.5 | 351-382 | 0.95-1.10 | 33-42 | 21-28 | <8 |
| Example 7 | 16.3 ± 0.5 | 372-403 | 0.98-1.10 | 33-45 | 24-29 | <6 |
| Comparative Example 1 | 16.0 ± 0.5 | 341-370 | 0.93-1.04 | 35-50 | 0 | <8 |
| Comparative Example 2 | 16.0 ± 0.5 | 338-373 | 0.95-1.03 | 32-49 | 0-2 | <8 |
| Comparative Example 3 | 18.0 ± 0.5 | 362-380 | 0.98-1.13 | 26-43 | 20-24 | <8 |
| Comparative Example 4 | 16.0 ± 0.5 | 335-368 | 0.90-1.02 | 31-54 | 0 | <8 |
| Comparative Example 5 | 17.0 ± 0.5 | 503-630 | 1.18-1.32 | 33-47 | 21-26 | <8 |
| Comparative Example 6 | 16.5 ± 0.5 | >1000 | >1.41 | 24-43 | 18-25 | <8 |
| Comparative Example 7 | 16.5 ± 0.5 | 450-650 | 1.15-1.30 | 1-4 | 1-4 | 50> |

Production of Anodes 96 wt % of carbon powder as an anode active material, 3 wt % of polyvinylidene fluoride (PVdF) as a binder and 1 wt % of carbon black as a conductive material were added to N-methyl-2-pyrrolidone (NMP) as a solvent to prepare a slurry. The slurry was applied to a 10 μm thick copper (Cu) foil as an anode collector and dried to produce an anode, which was then roll pressed.

Production of Cathodes 92 wt % of a lithiated cobalt composite oxide as a cathode active material, 4 wt % of carbon black as a conductive material and 4 wt % of PVDF as a binder were added to N-methyl-2-pyrrolidone (NMP) as a solvent to prepare a slurry. The slurry was applied to a 20 μm thick aluminum (Al) foil as a cathode collector and dried to produce a cathode, which was then roll pressed.

Fabrication of Batteries

The anode, the cathode and the separator were stacked to construct an electrode assembly. An electrolyte consisting of ethylene carbonate (EC)/ethyl methyl carbonate (EMC) (1:2, v/v) and 1 mole of lithium hexafluorophosphate ($LiPF_6$) was injected into the electrode assembly to fabricate a battery.

The cycle performance of the battery was tested at room temperature and 60° C. The results are shown in Table 4. Surface images of the separators produced in Examples 1-7 and Comparative Examples 1-5 were taken by scanning electron microscopy (SEM) and are shown in FIGS. 2-13, respectively.

TABLE 4

|  | Room temperature (cycle) | | | | 60° C. (cycle) | | | |
|---|---|---|---|---|---|---|---|---|
|  | 100 | 200 | 300 | 600 | 100 | 200 | 300 | 600 |
| Example 1 | 97-99% | 93-95% | 89-93% | 84-87% | 97-99% | 92-95% | 86-91% | 81-85% |
| Example 2 | 97-99% | 95-97% | 92-94% | 86-88% | 97-99% | 95-96% | 87-93% | 82-85% |
| Example 3 | 96-98% | 94-96% | 91-93% | 86-87% | 97-99% | 92-95% | 87-91% | 83-84% |
| Example 4 | 97-99% | 94-96% | 91-93% | 85-87% | 97-99% | 93-96% | 85-90% | 80-84% |
| Example 5 | 97-99% | 95-96% | 91-93% | 86-88% | 97-99% | 93-96% | 86-91% | 83-86% |
| Example 6 | 97-99% | 94-96% | 90-92% | 85-87% | 97-99% | 92-96% | 89-91% | 83-85% |
| Example 7 | 96-98% | 94-96% | 90-92% | 83-85% | 97-99% | 92-96% | 89-91% | 81-84% |
| Comparative Example 1 | — | — | — | — | — | — | — | — |
| Comparative Example 2 | — | — | — | — | — | — | — | — |
| Comparative Example 3 | 91-93% | 87-90% | 84-86% | 75-80% | 93-95% | 86-90% | 79-84% | 68-75% |
| Comparative Example 4 | — | — | — | — | — | — | — | — |
| Comparative Example 5 | 80-85% | 72-78% | 64-68% | <65% | 83-89% | 75-80% | 62-68% | <60% |
| Comparative Example 6 | 72-78% | 62-68% | 60-65% | <60% | 78-88% | 72-82% | 65-72% | <65% |
| Comparative Example 7 | — | — | — | — | — | — | — | — |

In Table 4, "-" means that it was impossible to fabricate a battery because the binding force between the electrode and the separator was either weak or nonexistent.

What is claimed is:

1. A method for producing a separator, comprising:
   (S1) preparing a porous substrate;
   (S2) dispersing inorganic particles and dissolving a first binder polymer in a solvent to prepare a slurry, the first binder polymer containing a copolymer comprising (a) a first monomer unit comprising either at least one amine group or at least one amide group or both in the side chain thereof and (b) a (meth)acrylate having a $C_1$-$C_{14}$ alkyl group as a second monomer unit, coating the slurry on at least one surface of the porous substrate, and drying the slurry to form a porous organic-inorganic coating layer; and (S3) coating a solution of 0.2 to 2.0% by weight of a second binder polymer on the organic-inorganic coating layer, and drying the polymer solution.

2. The method according to claim 1, wherein the second binder polymer has a solubility parameter different by at least 4 $(J/cm^3)^{0.5}$ from that of the first binder polymer.

3. The method according to claim 1, wherein the second binder polymer is selected from the group consisting of polyvinylidene fluoride-hexafluoropropylene, polyvinylidene fluoride-trichloroethylene, polyacrylonitrile, polyvinylpyrrolidone, and mixtures thereof.

\* \* \* \* \*